United States Patent Office 3,257,444
Patented June 21, 1966

3,257,444
3-HALO-4-CYANO-5,5-DI-(LOWER ALKYL)-2-CYCLOHEXENE-1-ONES
Hans Herbert Kuhnis and Rolf Denss, Basel, Switzerland, assignors to Geigy Chemical Corporation, Ardsley, N.Y., a corporation of Delaware
No Drawing. Original application June 21, 1962, Ser. No. 204,059. Divided and this application Oct. 28, 1963, Ser. No. 331,981
Claims priority, application Switzerland, June 22, 1961, 7,292/61; Mar. 2, 1962, 2,555/62
2 Claims. (Cl. 260—464)

The present application is a division of copending application, Serial No. 204,059, filed June 21, 1962.

The present invention concerns new intermediates useful for the manufacture of pharmaceutical agents of the formula

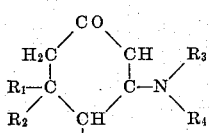

(I)

wherein $R_1$ and $R_2$ independently of each other represent lower alkyl and $NR_3R_4$ represents Amino,
Monoalkylamino having at most 12 carbon atoms,
Lower alkenylamino,
Di-(lower alkyl)amino,
Amino-(lower alkylene)-amino,
Di-(lower alkyl)-amino-(lower alkylene)-amino,
Hydroxy-(lower alkylene)- amine,
Phenylamino, (=anilino),
Chlorophenylene-amino,
Bromophenylene-amino,
Nitrophenylene-amino,
Hydroxyphenylene-amino,
(Lower alkoxy)-phenylene-amino,
Acetyl-phenylene-amino,
Benzylamino,
Chlorobenzylamino,
Bromobenzylamino,
Nitrobenzylamino,
Lower alkylbenzylamino,
N-lower alkoxybenzyl-N-lower alkyl-amino,
Di-(lower alkyl)-amino-benzylamino,
Phenyl-(lower alkylene)-amino,
N-lower alkyl-anilino,
N-benzyl-N-lower alkyl-amino,
N-(chloro-benzyl-N-lower alkyl-amino,
N-(bromo-benzyl)-N-lower alkyl-amino,
N-(nitro-benzyl)-N-lower alkyl-amino,
N-(lower alkyl-benzyl)-N-lower alkyl-amino,
N-(lower alkoxy-benzyl)-N-lower alkyl-amino,
N-(methylenedioxy-benzyl)-lower alkyl-amino,
N-[di-(lower alkyl)-amino benzyl]-N-lower alkyl-amino
N-phenyl-(lower alkylene)-N-lower alkyl-amino,
Dibenzylamino,
Naphthylamino,
Cycloalkylamino,
N-cycloalkyl-N-lower alkyl-amino,
N-(cycloalkyl-lower alkylene)-amino,
N-(cycloalkyl-lower alkylene)-N-lower alkyl-amino,
1-pyrrolidyl,
Piperidino,
Pyridyl-lower alkylene-amino,
Furfurylamino,
Antipyrylamino,
N-furfuryl-N-lower alkyl-amino,
N-pyridyl-N-lower alkyl-amino,
N-[pyridyl-lower alkylene]-lower alkyl-amino,
4-phenyl-4-ethoxycarbonyl-piperidino,
Morpholino,
Phenylhydrazino, and
Propylidenehydrazino have not been known.

It has been found that, surprisingly, the compounds of the Formula I produced according to the invention have an excellent sedative, analgetic, antipyretic and antiphlogistic action and also an excellent depressant action on the central nervous system with, at the same time, relatively slight toxicity. They are suitable in particular for the treatment of rheumatic conditions as well as for the removal on relief of pain due to various causes and for the treatment of conditions of psychic excitement and tension. They inhibit stimulation of the cough center.

The formula of the aforesaid new intermediates is (IA)

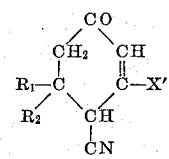

wherein

X' represents halogen and
$R_1$ and $R_2$ independently of each other represent lower alkyl.

The compounds of Formula IA are useful, for example, as starting materials for the manufacture of valuable pharmaceutical compounds. They are useful, in particular, for the manufacture of the compounds of Formula I, one possibility of this manufacture being illustrated by the process described hereinafter.

The qualification "lower" in the above definitions signifies a carbon content of $C_1$ to $C_4$.

The term "halogen" embraces chlorine and bromine.

The new starting materials of the Formula IA, i.e. wherein X is a halogen atom are obtained by treatment of substituted 4-cyano-cyclohexane-1,3-diones of the formula (II)

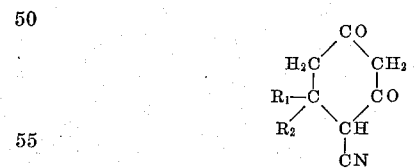

wherein $R_1$ and $R_2$ are as precedingly defined, with reactive inorganic acid halides or with phosgene. Phosphorus oxychloride, which simultaneously serves as reaction medium and is activated by the addition of a few percent of water, is particularly suitable. In addition, for the exchange of the hydroxyl group of the tautomeric enol form of compounds of the Formula II for halogen, phosphorus pentachloride, phosphorus trichlorodibromide and phosphorus tribromide can be employed, preferably in an equimolar amount in a suitable inert organic solvent or in phosphorus oxychloride. Because of their tendency to decompose, the halogen compounds of the formula IA so obtained are generally reacted directly as crude products with amines of the formula

(III)

wherein $NR_3R_4$ is as precedingly defined.

The following non-limitative examples further illustrate the production according to the invention of the new compounds. Parts are given therein as parts by weight unless otherwise stated; their relationship to parts by volume is as that of grams to cubic centimeters. The temperatures are in degrees centigrade.

*Example 1*

(a) 20 parts of 4-cyano-5,5-dimethyl-cyclohexane-1,3-dione are suspended in 100 parts by volume of phosphorus oxychloride and 3 parts by volume of water are slowly added while cooling with ice. The mixture is heated for 45 minutes at 100°, the phosphorus oxychloride is then removed by evaporation under vacuum and the residue is poured onto a mixture of ice and water. The water-in-soluble parts are extracted with ether, the ether solution is dried over sodium sulfate and concentrated, and the concentrate is distilled under vacuum (oil pump) whereupon 3-chloro-4-cyano-5,5-dimethyl-2-cyclohexene-1-one is obtained. $B.P._{0.01}$ 110–120°.

(b) 6.8 parts of the above compound and 3.7 parts of n-propylamine in 20 parts by volume of anhydrous ethanol are refluxed for 90 minutes. The reaction solution is then concentrated in vacuo, 2N-aqueous sodium hydroxide solution is then added to the residue which is then extracted with chloroform or methylene chloride. The chloroform or methylene chloride solution is washed with saturated sodium chloride solution, dried over sodium sulfate and concentrated. The residue is recrystallized from acetone whereupon 3-propylamino-4-cyano-5,5-dimethyl-2-cyclohexene-1-one is obtained. M.P. 155-156°.

*Example 2*

5.4 parts of the crude chloro compound obtained according to Example 1a and 4.42 parts of diethylamine in 15 parts by volume of anhydrous ethanol are refluxed for 2 hours. After working up as described in Example 1b and crystallization from acetone/ether, 3-diethylamino-4-cyano-5,5-dimethyl-2-cyclohexene-1-one is obtained. M.P. 134°.

*Example 3*

5.4 parts of the crude chloro compound obtained according to Example 1a and 6.4 parts of N-methylbenzylamine in 15 parts by volume of anhydrous ethanol are refluxed for 2 hours. After working up as described in Example 1b and crystallizing from acetone/ethanol, 3-(N-methylbenzylamino)-4-cyano-5,5-dimethyl-2-cyclohexene-1-one is obtained. M.P. 144–145°.

*Example 4*

10.7 parts of the crude chloro compound obtained according to Example 1a and 12.12 parts of di-n-propylamine in 30 parts by volume of anhydrous ethanol are refluxed for 1 hour. After working up as described in Example 1a and crystallizing from acetone/ether, 3-(di-n-propylamino)-4-cyano-5,5-dimethyl-2-cyclohexene-1-one is obtained. M.P. 84–86°.

When using 15.5 parts of di-n-butylamine or 23.9 parts of dibenzylamine instead of di-n-propylamine, 3-(di-n-butylamino)-4-cyano-5,5-dimethyl-2-cyclohexene-1-one or 3-dibenzylamino-4-cyano-5,5-dimethyl-2-cyclohexene-1-one, respectively, is obtained in an analogous manner.

What is claimed is:
1. A compound of the formula

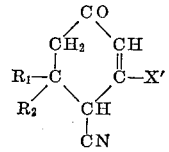

wherein
X' is a member selected from the group consisting of chlorine and bromine, and
$R_1$ and $R_2$ independently of each other are lower alkyl.
2. 3-chloro-4-cyano-5,5-dimethyl-2-cyclohexene-1-one.

No references cited.

CHARLES B. PARKER, *Primary Examiner.*